United States Patent
Sakuma

(10) Patent No.: US 10,210,443 B2
(45) Date of Patent: Feb. 19, 2019

(54) INFORMATION PROCESSING APPARATUS FOR DETERMINING WHETHER TO ACCEPT A USER INPUT VIA AN OPERATION PANEL BY OBTAINING OPERATION INFORMATION FROM AN AUTHENTICATION DEVICE

(71) Applicant: KONICA MINOLTA, INC., Chiyoda-ku, Tokyo (JP)

(72) Inventor: Keishi Sakuma, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/941,764

(22) Filed: Mar. 30, 2018

(65) Prior Publication Data

US 2018/0307955 A1    Oct. 25, 2018

(30) Foreign Application Priority Data

Apr. 24, 2017  (JP) .................................. 2017-085038

(51) Int. Cl.
*G06K 15/00* (2006.01)
*G07C 9/00* (2006.01)
(Continued)

(52) U.S. Cl.
CPC ..... *G06K 15/4095* (2013.01); *G07C 9/00158* (2013.01); *H04N 1/00854* (2013.01);
(Continued)

(58) Field of Classification Search
CPC .......... G06K 15/4095; H04N 1/00854; H04N 1/4426; H04N 1/4433; H04N 1/442; G07C 9/00158
See application file for complete search history.

(56) References Cited

U.S. PATENT DOCUMENTS

| 6,799,275 | B1 | 9/2004 | Bjorn |
| 2013/0055367 | A1* | 2/2013 | Kshirsagar ............ G06F 21/316 726/6 |

(Continued)

FOREIGN PATENT DOCUMENTS

| JP | 2009-182753 A | 8/2009 |
| JP | 2014-112274 A | 6/2014 |

OTHER PUBLICATIONS

Extended European Search Report issued in corresponding European Patent Application No. 18166997.9-1218, dated Aug. 8, 2018 (7 pages).

*Primary Examiner* — Benjamin O Dulaney
(74) *Attorney, Agent, or Firm* — Buchanan Ingersoll & Rooney PC

(57) ABSTRACT

An information processing apparatus operated by a user carrying an authentication device, includes: an operation panel accepting an operation performed by the user; and an apparatus hardware processor controlling the operation panel. The apparatus hardware processor performs a matching process of determining whether or not operation history information which is time series data of a sequence of operations performed by the user and accepted by the operation panel, and operation information about an operation of the operation panel performed by the user authenticated as a user permitted to use the information processing apparatus and acquired from the authentication device carried by the user, are related to operation of the same operation panel. If it is determined by the matching process that the operation history information and the operation information, match as information about operation of the same operation panel, the apparatus hardware processor performs an operation acceptance process.

11 Claims, 8 Drawing Sheets

(51) Int. Cl.
   *H04N 1/44*   (2006.01)
   *H04N 1/00*   (2006.01)
(52) U.S. Cl.
   CPC ........... *H04N 1/442* (2013.01); *H04N 1/4426* (2013.01); *H04N 1/4433* (2013.01)

(56) References Cited

U.S. PATENT DOCUMENTS

| | | |
|---|---|---|
| 2013/0133052 A1 | 5/2013 | Davis |
| 2014/0232648 A1* | 8/2014 | Park .................... G06F 3/0483 345/156 |
| 2015/0146879 A1* | 5/2015 | Nguyen ............... H04R 1/1041 381/74 |
| 2015/0193069 A1* | 7/2015 | Di Censo ................ G06F 3/017 345/173 |
| 2017/0041784 A1 | 2/2017 | Watanabe |

\* cited by examiner

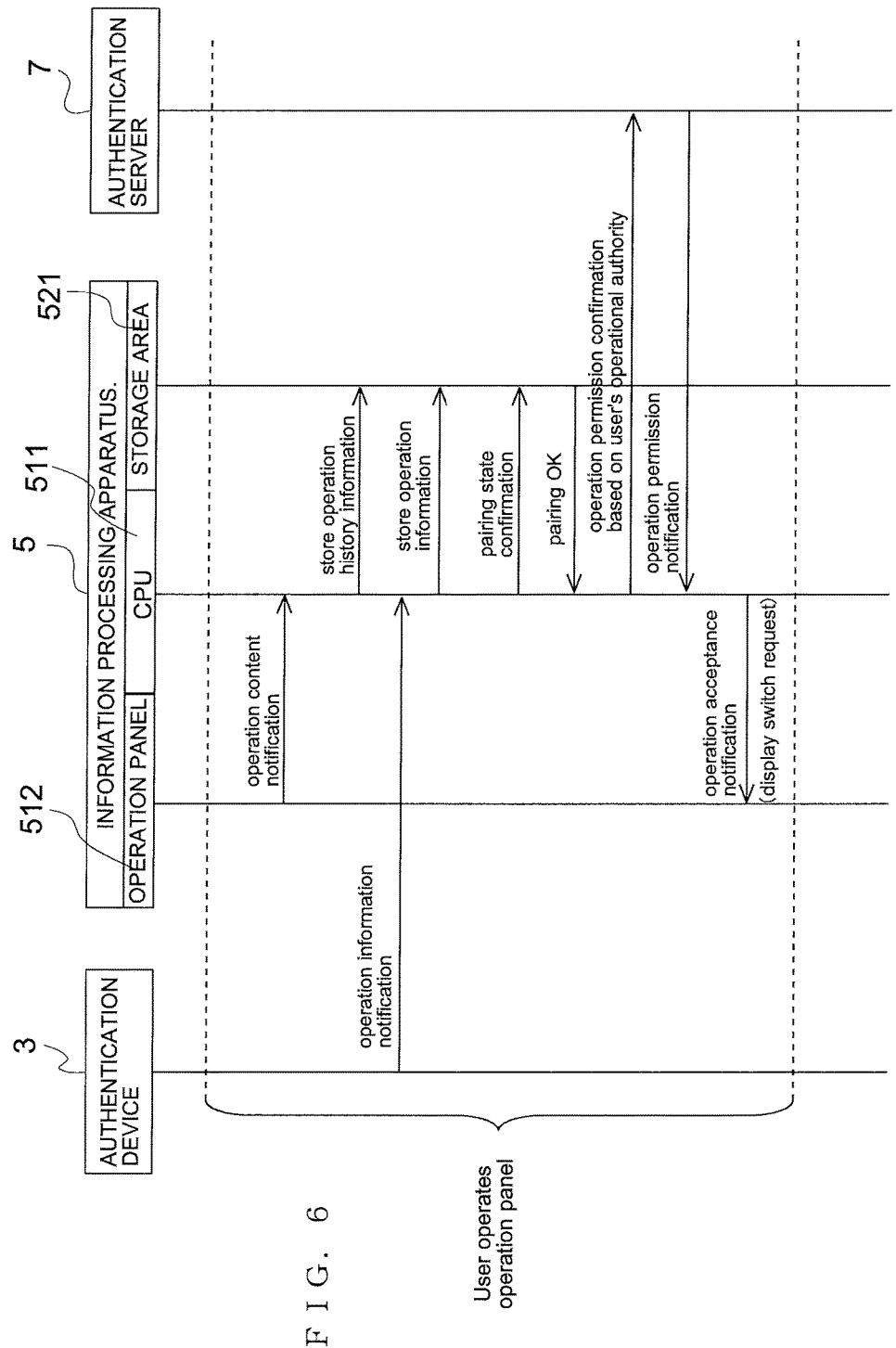
F I G. 6

INFORMATION PROCESSING APPARATUS FOR DETERMINING WHETHER TO ACCEPT A USER INPUT VIA AN OPERATION PANEL BY OBTAINING OPERATION INFORMATION FROM AN AUTHENTICATION DEVICE

The entire disclosure of Japanese patent Application No. 2017-085038, filed on Apr. 24, 2017, is incorporated herein by reference in its entirety.

BACKGROUND

Technological Field

The present disclosure relates to an information processing apparatus, an information processing system and a non-transitory computer readable medium including programmed instructions.

Description of the Related Art

Conventionally, after shifting to a log-in state by a log-in operation in which it is required to input a user ID and a password, an information processing apparatus maintains the log-in state associated with the user ID until logging out. Accordingly, while the log-in state associated with a user ID continues, the information processing apparatus accepts operations by right assigned to the user even if the operation is performed by a user who does not possess the user ID, so that unauthorized use or the like is possible by impersonation.

In this situation, it is proposed to accept user's operation only while biometric information of the user can be continuously read (for example, refer to Japanese Unexamined Patent Application Publication No. 2009-182753). On the other hand, it is proposed to continue detecting a user in the vicinity of an information processing apparatus with a human sensor after shifting the log-in state by user's operation, so that the log-in state is released when the user leaves the information processing apparatus (for example, refer to Japanese Unexamined Patent Application Publication No. 2014-112274).

SUMMARY

However, in accordance with the prior art technique described in Japanese Unexamined Patent Application Publication No. 2009-182753, a user is forced to continue troublesome operation such as placing a finger on a fingerprint authentication apparatus to determine whether or not biometric information of a user can continuously be read. In accordance with the prior art technique described in Japanese Unexamined Patent Application Publication No. 2014-112274, a user is requested to perform a particular log-in operation such as operation of a re-login key when the user shifts in the log-in state again after the log-in state is released. Accordingly, the prior art techniques described in Japanese Unexamined Patent Application Publication No. 2009-182753 and Japanese Unexamined Patent Application Publication No. 2014-112274 can provide an improved security level but cannot improve user convenience. In other words, it is impossible by the prior art techniques to improve both the security level and user convenience.

Taking into consideration the above circumstances, it is an object of the present disclosure therefore to improve both the security level and user convenience.

To achieve at least one of the abovementioned objects, according to an aspect of the present invention, an information processing apparatus which is operated by a user who carries an authentication device, comprises: an operation panel which accepts an operation performed by the user; and an apparatus hardware processor which controls the operation panel, wherein the apparatus hardware processor performs a matching process of determining whether or not operation history information which is time series data of a sequence of operations performed by the user and accepted by the operation panel, and operation information which is about an operation of the operation panel performed by the user authenticated as a permitted user who is permitted to use the information processing apparatus and which is acquired from the authentication device carried by the user, match as information about operation of the same operation panel, and wherein if it is determined by the matching process that the operation history information and the operation information match as information about operation of the same operation panel, the apparatus hardware processor performs an operation acceptance process to accept the operation of the operation panel performed by the user.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 shows a control sequence of the information processing system 1 when an operation panel 512 is operated.

DETAILED DESCRIPTION OF THE EMBODIMENTS

Hereinafter, one or more embodiments of the present invention will be described with reference to the drawings. However, the scope of the invention is not limited to the disclosed embodiments. Incidentally, as used in the detailed description of the embodiments, the terms "comprise," "consist of," "include," "including," "have," "incorporate," and any synonyms thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Furthermore, unless otherwise specifically indicated, the term "or" represents "inclusive or" but does not means "exclusive or". For example, "condition A or condition B" is true in any of the case that condition A is true and condition B is false, the case that condition A is false and condition B is true, and the case that condition A is true and condition B is true.

The present disclosure is related also to the apparatus that performs processing as described herein. Such an apparatus may specifically be built for the intended purpose, or may be built as a general purpose computer which is selectively activated or reconfigured by a computer program stored in the computer.

Also, the algorithm as explained here does not require a particular computer or apparatus. Various general purpose systems can be used together with a program which is designed in accordance with this description. Alternatively, it may be understood that a particular apparatus dedicated to perform necessary method steps can be conveniently used. The structure required for these various systems will be apparent from the following explanation. Furthermore, the present disclosure does not depend on any particular programming language. It will be understood that various programming languages can be used to realize the technique described here.

Figure 1:
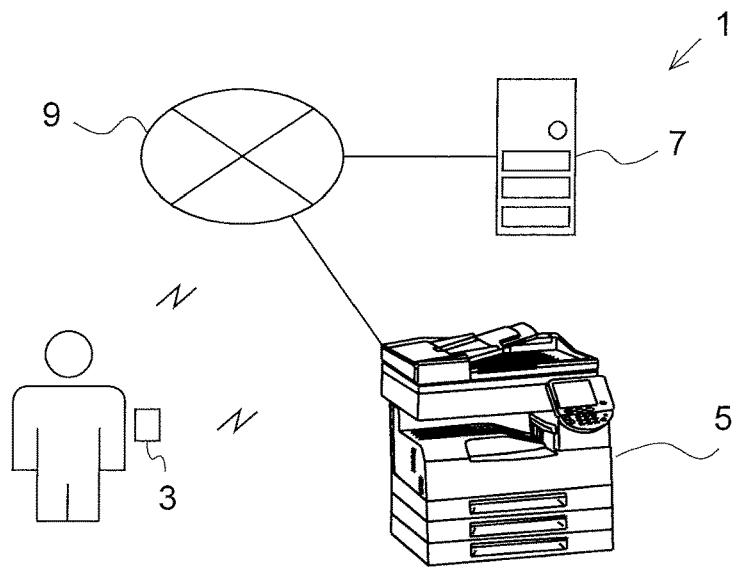
FIG. 1 is a schematic view for showing an example of the overall configuration of an information processing system 1 to which the present disclosure is applied.

FIG. 1 is a schematic view for showing an example of the overall configuration of an information processing system 1 to which the present disclosure is applied. As illustrated in FIG. 1, the information processing system 1 includes an authentication device 3, an information processing apparatus 5 and an authentication server 7 which are interconnected with each other through a network 9 to transmit and receive various signals. In the information processing system 1, the authentication device 3 and the information processing apparatus 5 have a short distance communication function respectively and can communicate with each other. The network 9 comprises a communication network in compliance with a communication standard such as Ethernet (registered trademark), a wireless communication network in compliance with a communication standard such as IEEE 802.11 or a short distance wireless communication network in compliance with a communication standard such as Bluetooth (registered trademark).

The information processing system 1 accepts user's operation if operation history information which is time series data of a sequence of operations accepted by the information processing apparatus 5 and operation information about operation of the information processing apparatus 5 performed by the user, who is permitted to use the information processing apparatus 5, and acquired from the authentication device 3 carried by the user match as information about operation of the same operation panel 512. In what follows, this technique will be explained in detail.

Figure 2:
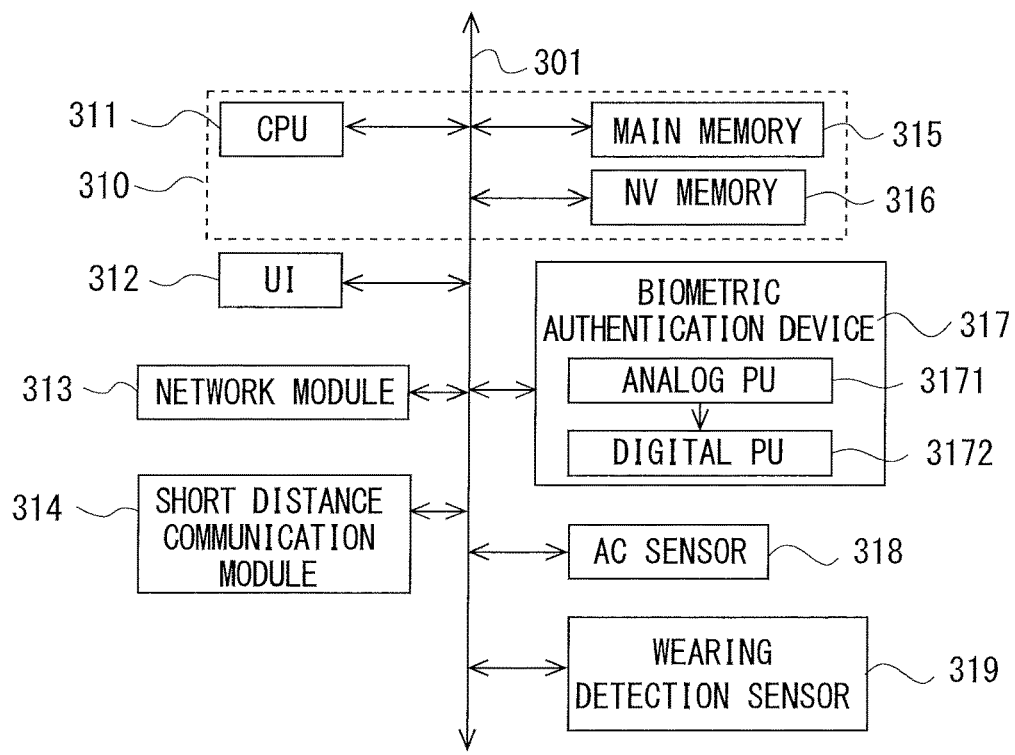
FIG. 2 is a view showing an exemplary structure of an authentication device 3.

FIG. 2 is a view showing an exemplary structure of the authentication device 3. The authentication device 3 is configured as a wearable terminal which can be worn on a user's body and carried by a user who is permitted to use the information processing apparatus 5. The authentication device 3 is carried by a user, for example, by wearing the authentication device 3 around an arm of the user. The authentication device 3 includes a CPU 311, a user interface 312, a network module 313, a short distance communication module 314, a main memory 315, a nonvolatile memory 316, a biometric authentication device 317, an acceleration sensor 318 and a wearing detection sensor 319, which are interconnected with each other through a bus 301. The CPU 311, the main memory 315 and the nonvolatile memory 316 function as a device control unit 310 in cooperation with a control module implemented with a plurality of programs stored in the main memory 315 or the nonvolatile memory 316.

The CPU 311 is formed by integrating one or more cores to implement a plurality of logical processors in accordance with the number of the cores to generally control the authentication device 3. The core includes logical circuits and a cache memory for performing arithmetic operations. The main memory 315 is made, for example, of a RAM (Random Access Memory) which temporarily stores various data and the control module which is run by the CPU 311. The nonvolatile memory 316 is made, for example, of a ROM (Read Only Memory) or SSD (Solid State Drive) which stores an OS (Operating System), various control modules including a system control module and a mechanical control module and various data.

The user interface 312 is implemented with a touch panel or keys for entering various kinds of inputs. The network module 313 is an interface for performing communication with the authentication server 7, and implemented as a network interface having a function to connect to a communication network in compliance with a communication standard such as Ethernet (registered trademark) or a wireless communication network in compliance with a communication standard such as IEEE 802.11. The short distance communication module 314 is an interface for performing mutual communication with a terminal such as the information processing apparatus 5, and implemented as a network interface having a function to connect to a short distance wireless communication network in compliance with a communication standard such as Bluetooth (registered trademark). The biometric authentication device 317 can perform, when a user wears the authentication device 3, biometric authentication to determine whether or not the user wearing the authentication device 3 is the same person as a user whose biometric information is stored in the nonvolatile memory 316 in advance as the owner of the authentication device 3. The acceleration sensor 318 is a sensor which can detect motion or vibration of an arm of a user.

The biometric authentication device 317 has a function to perform electrocardiogram authentication. Specifically, the biometric authentication device 317 is provided with an analog processing unit 3171 and a digital processing unit 3172. The analog processing unit 3171 amplifies a very weak electrical signal caused by a periodic motion of a heart of a user, performs an anti-aliasing process with the amplified electrical signal and detects the potential of the electrical signal after performing the anti-aliasing process in synchronization with a sampling frequency to generate electrocardiogram signals. The digital processing unit 3172 removes disturbance from the electrocardiogram signals, which is input from the analog processing unit 3171, calculates a feature amount by extracting a heart pulsation pattern from the electrocardiogram signals, from which disturbance is removed, and registers in the nonvolatile memory 316 the calculated feature amount as biometric information which is associated with the ID information of a user who is permitted to use the information processing apparatus 5. The biometric authentication device 317 calculates a correlation coefficient indicative of the degree of correlation between the feature amount acquired when a user wears the authentication device 3 and the feature amount registered in the nonvolatile memory 316, and obtains the degree of correlation between the feature amount acquired when a user wears the authentication device 3 and the feature amount registered in the nonvolatile memory 316 based on the correlation coefficient and a correlation threshold. It is therefore possible to determine whether or not the biometric information of the user wearing the authentication device 3 matches the biometric information of the permitted user registered in the nonvolatile memory 316.

The acceleration sensor 318 detects an acceleration, for example, by the use of variation of an electrostatic capacity or the like, and registers the acceleration and time information when the acceleration is detected in the nonvolatile memory 316. The time information may be acquired by software such as a time module which counts time, acquired based on the natural oscillation frequency of a crystal resonator, or acquired from a GPU (Graphics Processing Unit) which is not shown in the figure. Incidentally, based on the acceleration acquired by the acceleration sensor 318, the operational type of user's operation such as swiping, flicking, tapping, pushing or the like may be detected.

The wearing detection sensor 319 detects whether or not the authentication device 3 is being worn, and registers the detection result in the nonvolatile memory 316. Whether or not the authentication device 3 is being worn may be detected by examining part of user's body with an optical sensor or the like, or by providing the authentication device 3 with a circuit which is brought into conductive state when the authentication device 3 is being worn.

Figure 3:
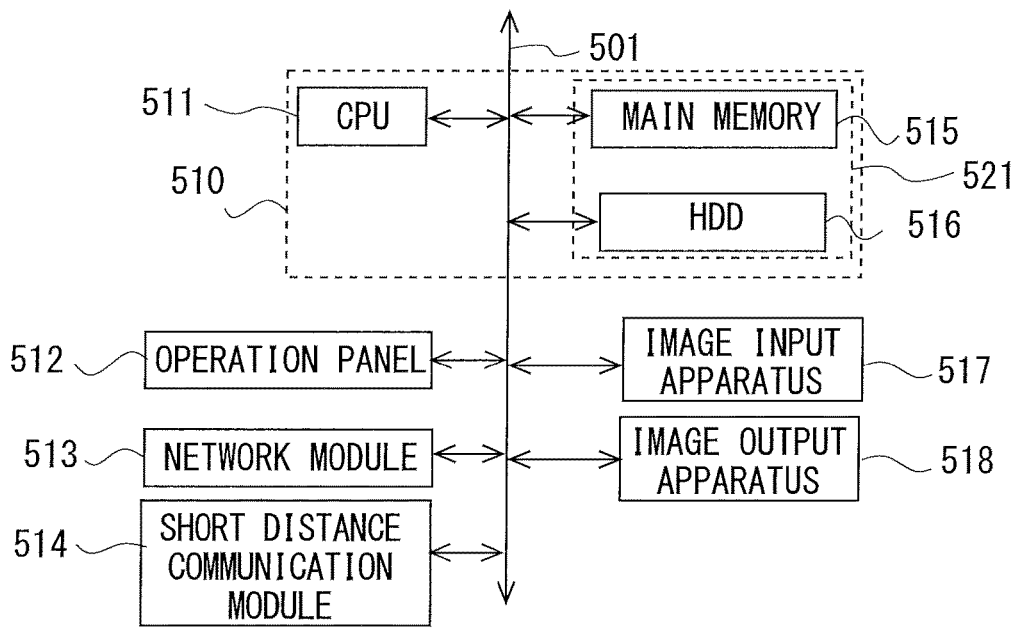
FIG. 3 is a view showing an exemplary structure of an information processing apparatus 5.

FIG. 3 is a view showing an exemplary structure of the information processing apparatus 5. The information processing apparatus 5 includes a CPU 511, an operation panel 512, a network module 513, a short distance communication module 514, a main memory 515, an apparatus storage unit 516, an image input apparatus 517 and an image output apparatus 518, which are interconnected with each other through a bus 501. The CPU 511, the main memory 515 and the apparatus storage unit 516 function as a apparatus control unit 510 in cooperation with a control module implemented with a plurality of programs stored in the main memory 515 or the apparatus storage unit 516. The main memory 515 and the apparatus storage unit 516 function as a storage area 521 of the apparatus control unit 510.

The CPU 511 is formed by integrating one or more cores to implement a plurality of logical processors in accordance with the number of the cores to generally control the information processing apparatus 5. The core includes logical circuits and a cache memory for performing arithmetic operations. The main memory 515 is made, for example, of a RAM (Random Access Memory) which temporarily stores various data and the control module which is run by the CPU 511. The apparatus storage unit 516 is made, for example, of a ROM (Read Only Memory), SSD (Solid State Drive) or HDD (Hard Disk Drive) which stores an OS (Operating System), various control modules including a system control module and a mechanical control module and various data.

The operation panel 512 accepts user's operations and displays information about the operation performed by the user. The operation panel 512 is implemented, for example, with a liquid crystal display incorporating a touch panel or various types of keys. The network module 513 is an interface for performing communication with the authentication server 7, and implemented as a network interface having a function to connect to a communication network in compliance with a communication standard such as Ethernet (registered trademark) or a wireless communication network in compliance with a communication standard such as IEEE 802.11. The short distance communication module 514 is an interface for performing mutual communication with a terminal such as the authentication device 3, and implemented as a network interface having a function to connect to a short distance wireless communication network in compliance with a communication standard such as Bluetooth (registered trademark).

The image input apparatus 517 is for example a scanner which radiates light from a light source such as a fluorescent lamp to an original which is placed in a predetermined reading position of an original placement tray, photoelectrically converts light reflected from the original with an imaging device such as a CCD (Charge Coupled Device) image sensor, and generates image data from the electrical signal as converted. The image output apparatus 518 is for example a print engine which performs image formation on a sheet through electrification, exposure, development, transfer and fixing processes, and output the printed sheet.

Figure 4:
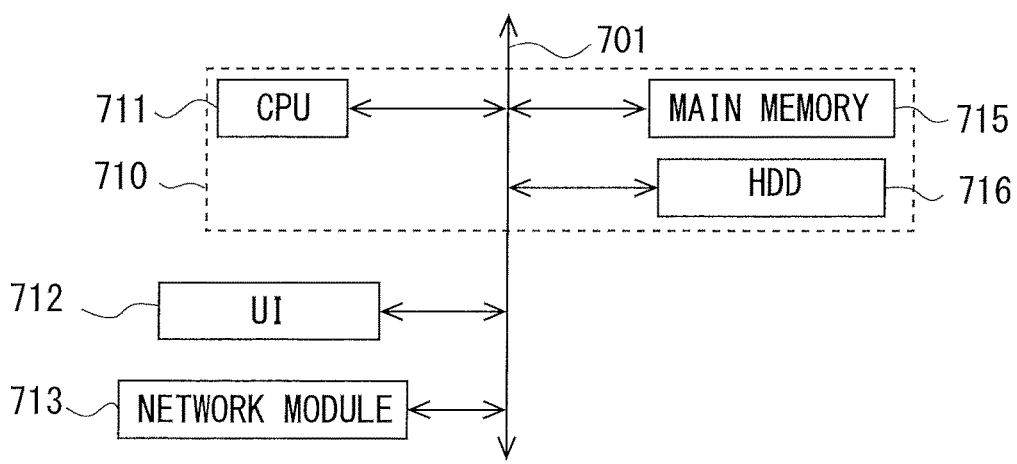
FIG. 4 is a view showing an exemplary structure of an authentication server 7.

FIG. 4 is a view showing an exemplary structure of the authentication server 7. The authentication server 7 includes a CPU 711, a user interface 712, a network module 713, a main memory 715, a server storage unit 716, which are interconnected with each other through a bus 701. The CPU 711, the main memory 715 and the server storage unit 716 function as a server control unit 710 in cooperation with a control module implemented with a plurality of programs stored in the main memory 715 or the server storage unit 716.

The CPU 711 is formed by integrating one or more cores to implement a plurality of logical processors in accordance with the number of the cores to generally control the authentication server 7. The core includes logical circuits and a cache memory for performing arithmetic operations. The main memory 715 is made, for example, of a RAM (Random Access Memory) which temporarily stores various data and the control module which is run by the CPU 711. The server storage unit 716 is made, for example, of a ROM (Read Only Memory), SSD (Solid State Drive) or HDD (Hard Disk Drive) which stores an OS (Operating System), various control modules including a system control module and a mechanical control module and various data. The user interface 712 is implemented with a touch panel or keys for entering various kinds of inputs. The network module 713 is an interface for performing communication with the authentication device 3 or the information processing apparatus 5, and implemented as a network interface having a function to connect to a communication network in compliance with a communication standard such as Ethernet (registered trademark) or a wireless communication network in compliance with a communication standard such as IEEE 802.11.

Figure 5:
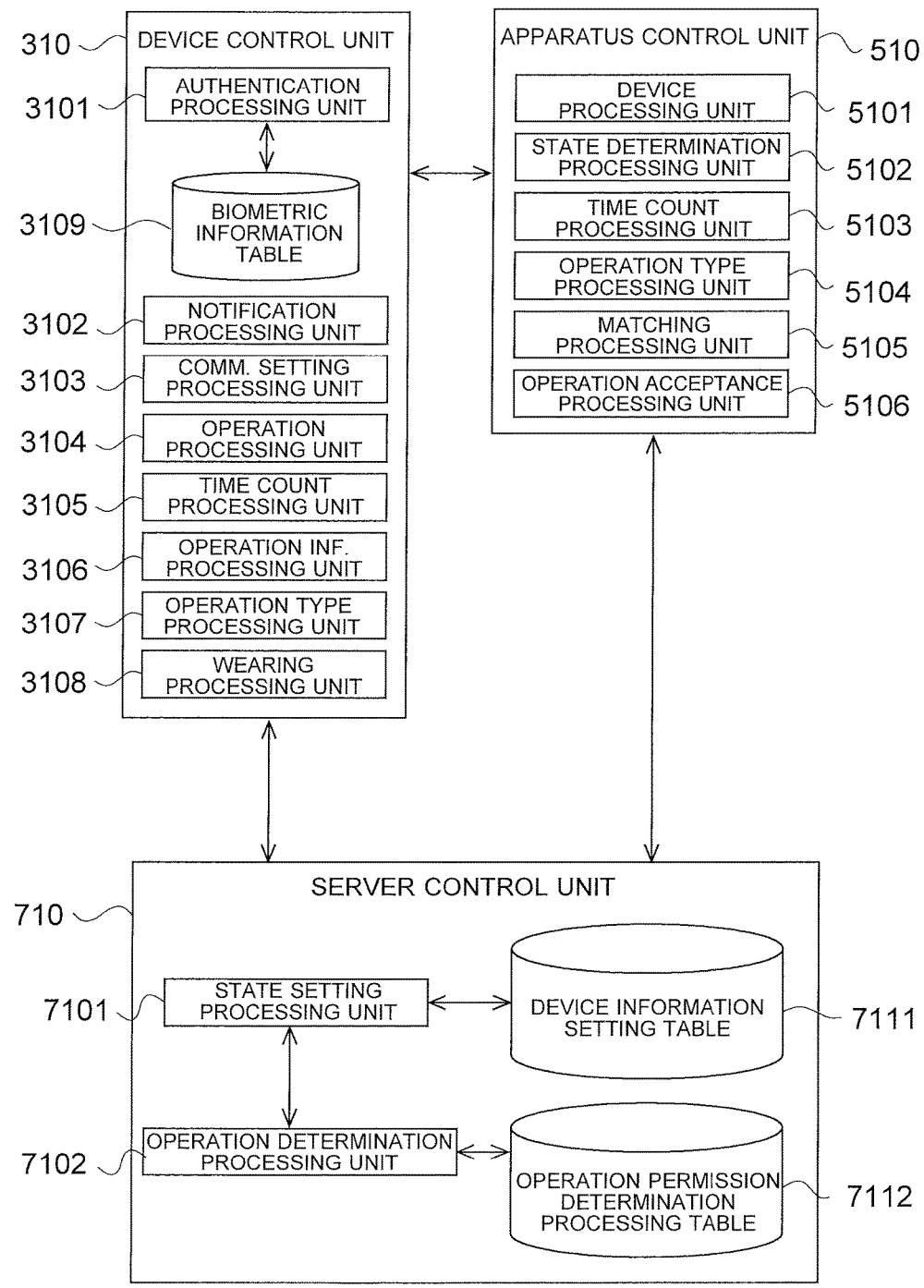
FIG. 5 is a block diagram for showing examples of the functions of a device control unit 310, an apparatus control unit 510 and a server control unit 710 respectively.

FIG. 5 is a block diagram for showing examples of the functions of the device control unit 310, the apparatus control unit 510 and the server control unit 710 respectively. The device control unit 310 is configured to implement an authentication processing unit 3101, a notification processing unit 3102, a communication setting processing unit 3103, an operation processing unit 3104, a time count processing unit 3105, an operation information processing unit 3106, an operation type processing unit 3107, a wearing processing unit 3108 and a biometric information table 3109. In other words, the device control unit 310 is, which is implemented by running on the CPU 311, a control module which implements the authentication processing unit 3101, the notification processing unit 3102, the communication setting processing unit 3103, the operation processing unit 3104, the time count processing unit 3105, the operation information processing unit 3106, the operation type processing unit 3107, the wearing processing unit 3108 and the biometric information table 3109.

The authentication processing unit 3101 controls an authentication operation of the biometric authentication device 317. The biometric information table 3109 is used to store ID information and biometric information of users permitted to use the information processing apparatus 5 in association with each other. Accordingly, the authentication processing unit 3101 can determine whether or not the user wearing the authentication device 3 is the permitted user which has been stored in the biometric information table 3109 by comparing the biometric information, which is acquired by the biometric authentication device 317, of the user wearing the authentication device 3 with the biometric information of the permitted user which has been stored in the biometric information table 3109. Specifically, if it is determined that the biometric information, which is acquire by the biometric authentication device 317, of the user wearing the authentication device 3 is of the same user as the biometric information of a permitted user which has been stored in the biometric information table 3109, the authentication processing unit 3101 determines that the user wearing the authentication device 3 is the permitted user which has been stored in the biometric information table 3109. When it is determined that the user wearing the authentication device 3 is the permitted user which has been stored in the biometric information table 3109, the authentication processing unit 3101 stores the authentication result in the biometric information table 3109 to indicate that the authentication device 3 carried by the user corresponding to the permitted user is in an authenticated state. In other words, the ID information and biometric information of the user permitted to use the information processing apparatus 5 is stored in the biometric information table 3109 as well as the authentication result in association with each other.

When the biometric information table 3109 stores the authentication result that the authentication device 3 carried by the user is in an authenticated state, the notification processing unit 3102 notifies the authentication server 7 that the authentication device 3 carried by the user is in an authenticated state by transmitting the ID information of the permitted user and the authentication result. Also, when the biometric information table 3109 stores the authentication result that the authentication device 3 carried by the user is in an authenticated state, the communication setting processing unit 3103 enables the function to perform short distance communication with the information processing apparatus 5. Conversely, when the biometric information table 3109 stores the authentication result that the authentication device 3 carried by the user is not in an authenticated state, the communication setting processing unit 3103 disables the function to perform short distance communication with the information processing apparatus 5.

The operation type processing unit 3107 generates operation type information which indicates the operation type of an operation performed by a user with the operation panel 512. The operation processing unit 3104 generates operation information including information that user operated the operation panel 512. The time count processing unit 3105 counts time information when a user operates the operation panel 512. The operation information includes the ID information of a permitted user and the time information counted by the time count processing unit 3105. Also, the operation information may include the operation type information generated by the operation type processing unit 3107. The operation information processing unit 3106 transmits operation information generated by the operation processing unit 3104 and the time count processing unit 3105 to the information processing apparatus 5 through the short distance communication module 314. Specifically, when the user is in an authenticated state, the function to perform short distance communication with the information processing apparatus 5 is enabled so that the authentication device 3 can perform short distance communication with the information processing apparatus 5. While performing short distance communication with the information processing apparatus 5, the authentication device 3 transmits operation information to the information processing apparatus 5. Since the operation information includes the ID information of the permitted user, the information processing apparatus 5 can query the authentication server 7 to determine whether or not the authentication device 3 is in an authenticated state during short distance communication as described below. The wearing processing unit 3108 processes the result of detection by the wearing detection sensor 319 such as whether or not the authentication device 3 is worn on the user's body. When the wearing detection sensor 319 detects that the authentication device 3 is not worn on the user's body, the wearing processing unit 3108 transmits an authentication reset notification to the authentication server 7 through the network module 313.

The apparatus control unit 510 is configured to implement a device processing unit 5101, a state determination processing unit 5102, a time count processing unit 5103, an operation type processing unit 5104, a matching processing unit 5105 and an operation acceptance processing unit 5106. In other words, the apparatus control unit 510 is, which is implemented by running on the CPU 511, a control module which implements the device processing unit 5101, the state determination processing unit 5102, the time count processing unit 5103, the operation type processing unit 5104, the matching processing unit 5105 and the operation acceptance processing unit 5106.

The device processing unit 5101 performs the process of detecting the authentication device 3 approaching the information processing apparatus 5 by the use of the short distance communication function of the short distance communication module 514. When the authentication device 3 is detected, the device processing unit 5101 acquires the ID information of the permitted user from the detected authentication device 3. The state determination processing unit 5102 queries the authentication server 7 for the purpose of performing the process of determining whether or not the ID information of the permitted user acquired from the authentication device 3 corresponds to the authentication device 3 which is in an authenticated state. Then, based on the query result, the state determination processing unit 5102 performs the process of determining whether or not the ID information of the permitted user acquired from the authentication device 3 corresponds to the authentication device 3 which is in an authenticated state. The time count processing unit 5103 counts time information when a user operates the operation panel 512. The operation type processing unit 5104 generates operation type information which indicates the operation type of an operation performed by a user with the operation panel 512. The matching processing unit 5105 performs a matching process to determine whether or not operation history information and operation information match as information about operation of the same operation panel 512. Specifically, if the state determination processing unit 5102 determines that the ID information of the permitted user corresponds to the user carrying the authentication device 3 which is in an authenticated state as notified by the notification processing unit 3102, the matching processing unit 5105 performs a matching process.

The operation acceptance processing unit 5106 stores information about operations of the operation panel 512 performed by a user together with time information of the time count processing unit 5103 in a time series as operation history information. The operation acceptance processing unit 5106 may also store operation type information. When the matching process is affirmatively performed by the matching processing unit 5105, the operation acceptance processing unit 5106 queries the authentication server 7 to determine whether or not the operation performed by a user is a permitted operation. If the operation performed by a user is a permitted operation, the operation acceptance processing unit 5106 has the operation panel 512 accept the user's operation. Conversely, if the operation performed by a user is not a permitted operation, the operation acceptance processing unit 5106 has the operation panel 512 refuse to accept the user's operation. In other words, when the matching process is affirmatively performed by the matching processing unit 5105 and the user is given an operational authority to perform the user's operation, the operation acceptance processing unit 5106 having the operation panel 512 accepts the user's operation.

The server control unit 710 is configured to implement a state setting processing unit 7101, an operation determination processing unit 7102, a device information setting table 7111 and an operation permission determination table 7112. In other words, the operation determination processing unit 710 is, which is implemented by running on the CPU 711, a control module which implements the state setting processing unit 7101, the operation determination processing unit 7102, the device information setting table 7111 and the operation permission determination table 7112.

The state setting processing unit 7101 updates the device information setting table 7111 based on the authentication result and the ID information of the permitted user transmitted from the authentication device 3. The device information setting table 7111 stores the authentication result and the ID information of the permitted user transmitted from the authentication device 3 for each authentication device 3. When the authentication device 3 transmits an authentication reset notification, the state setting processing unit 7101 updates the device information setting table 7111 by associating the authentication reset information with the authentication result and the ID information of the permitted user for each authentication device 3. The operation permission determination table 7112 stores information about operation and existence of operational authority in association with each other for the ID information of each permitted user.

For example, the operation permission determination table 7112 stores information about an operation to access information having high secrecy such as a telephone book and existence of operational authority to access such information having high secrecy in association with each other for the ID information of each permitted user. Also, for example, the operation permission determination table 7112 stores information about an operation to access various servers such as the authentication server 7 and existence of operational authority, i.e., access authority to the various servers in association with each other for the ID information of each permitted user. Furthermore, for example, the operation permission determination table 7112 stores information about operation to perform color copy operations and existence of operational authority, i.e., viability to perform such an operation in association with each other for the ID information of each permitted user. Furthermore, for example, the operation permission determination table 7112 stores information about an operation to perform monochrome copy operations and existence of operational authority, i.e., viability to perform such an operation in association with each other for the ID information of each permitted user. The operation determination processing unit 7102 refers to the operation permission determination table 7112 to determine whether or not an operational authority is given to a user with respect to operation content transmitted from the information processing apparatus 5.

Incidentally, the operation permission determination table 7112 may be used to further store a particular operation which requires determination of operation acceptance/rejection based on existence of the operational authority in association with the ID information of each permitted user. For example, the operation permission determination table 7112 may be used to store the process of switching the screen displayed on the operation panel 512 and existence of the operational authority to perform the switching process in association with the ID information of each permitted user. Also, for example, the operation permission determination table 7112 may be used to store the process of selecting a job in response to user's operation and existence of the operational authority to perform the selecting process in association with the ID information of each permitted user. Furthermore, for example, the operation permission determination table 7112 may be used to store the file related process of accessing a directory in response to user's operation and existence of the operational authority to perform the file related process in association with the ID information of each permitted user. If it is determined by referring to the operation permission determination table 7112 that information about operation performed by a user transmitted from the information processing apparatus 5 corresponds to a particular operation which requires determination of operation acceptance/rejection based on existence of the operational authority, the operation determination processing unit 7102 determines whether or not the operational authority is given.

Incidentally, the operation permission determination table 7112 can store information which can be used to determine the operational authority in place of existence of the operational authority.

Figure 7:
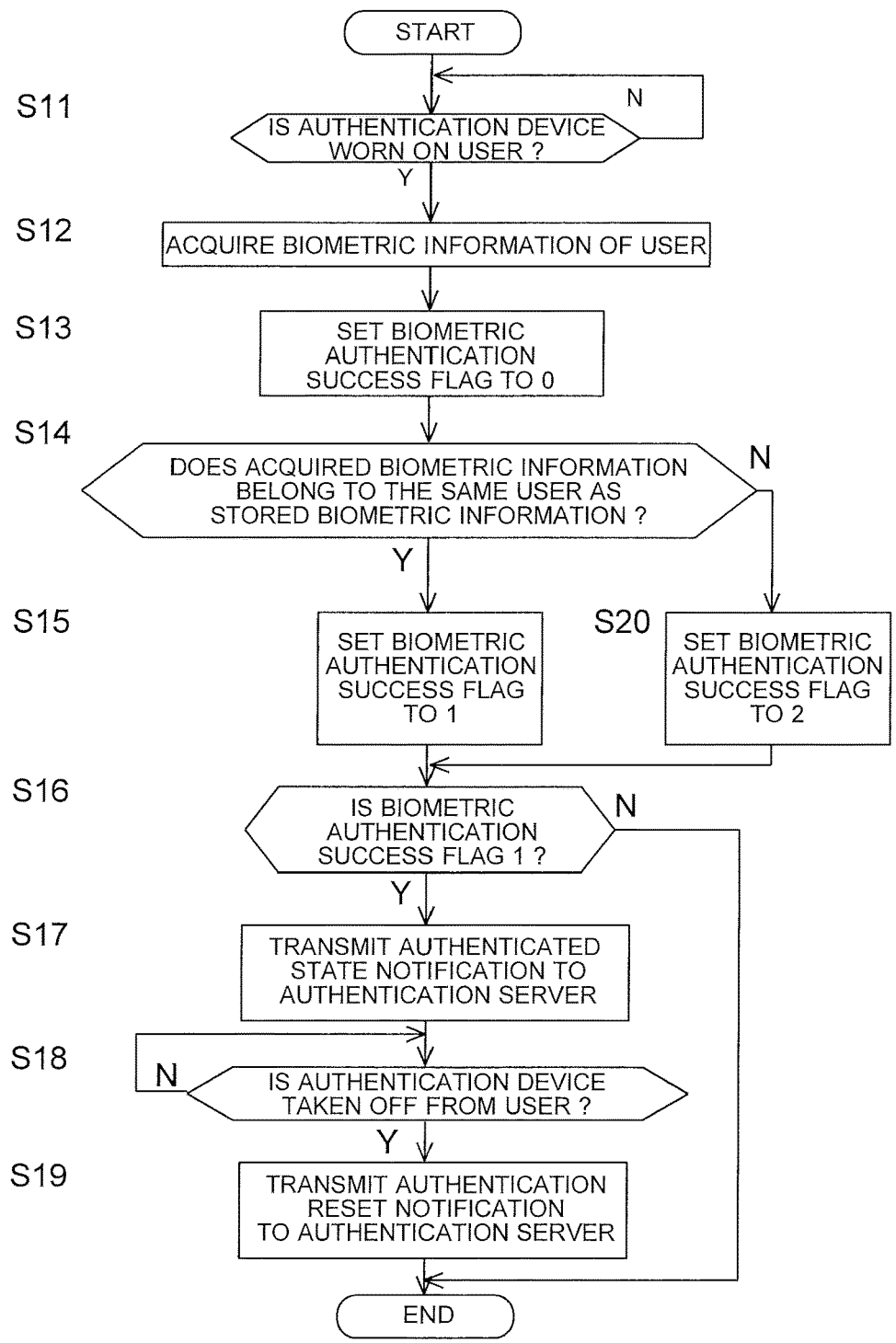
FIG. 7 is a flow chart for explaining a pre-approval example with the authentication device 3.
Figure 8:
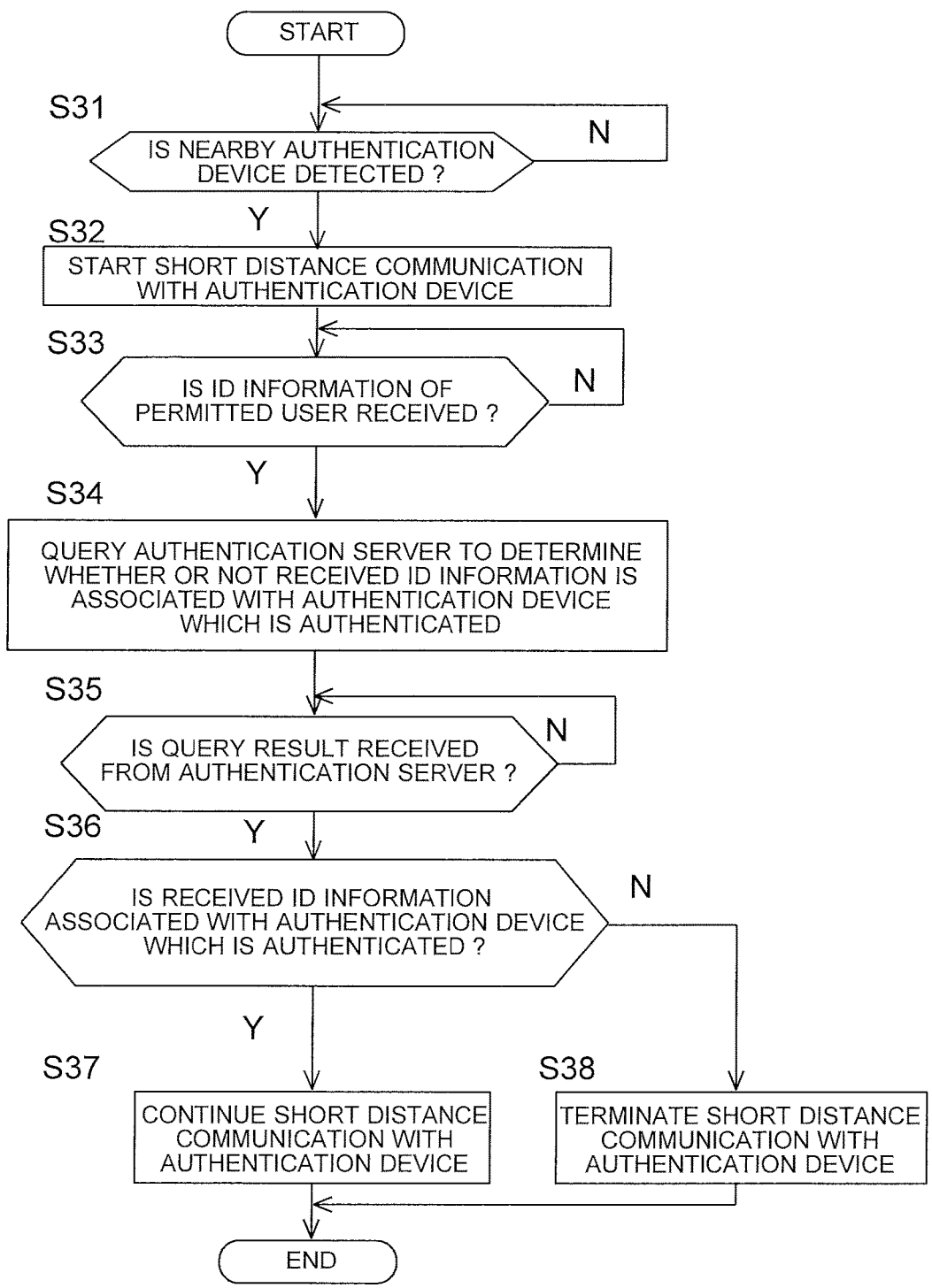
FIG. 8 is a flow chart for explaining an initial communication example between the authentication device 3 and the information processing apparatus 5.
Figure 9:
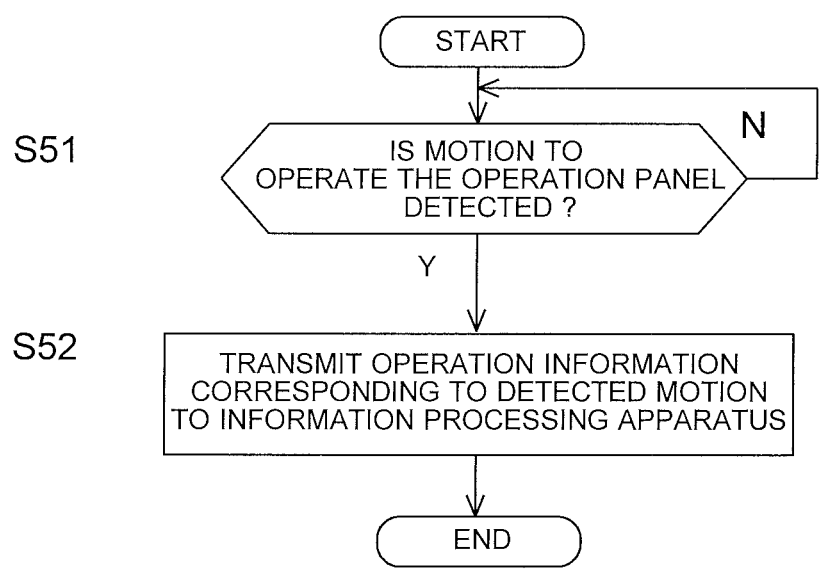
FIG. 9 is a flow chart for explaining a control example of the authentication device 3 when a user operates the operation panel 512 of the information processing apparatus 5.
Figure 10:
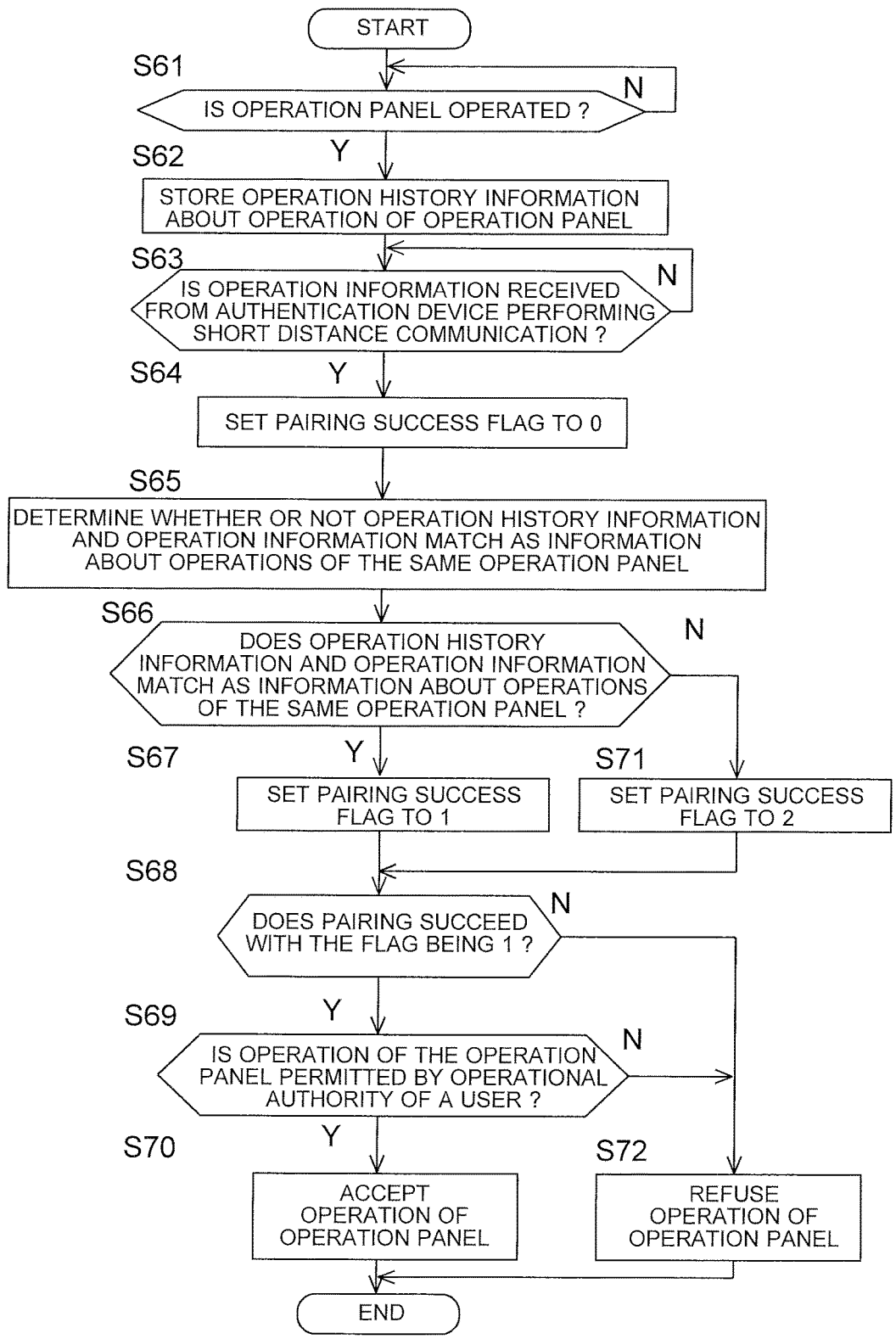
FIG. 10 is a flow chart for explaining a control example of the information processing apparatus 5 when a user operates the operation panel 512 of the information processing apparatus 5.

FIG. 6 shows a control sequence of the information processing system 1 when the operation panel 512 is operated. FIG. 7 is a flow chart for explaining a pre-approval example with the authentication device 3. FIG. 8 is a flow chart for explaining an initial communication example between the authentication device 3 and the information processing apparatus 5. FIG. 9 is a flow chart for explaining a control example of the authentication device 3 when a user operates the operation panel 512 of the information processing apparatus 5. FIG. 10 is a flow chart for explaining a control example of the information processing apparatus 5 when a user operates the operation panel 512 of the information processing apparatus 5.

The information processing system 1 performs identification and authentication of a user who operates the operation panel 512 and the operation acceptance determination of the operation panel 512 based on the authority information of the identified user by control which is mainly composed of three processes. The first process includes a biometric authentication process with the authentication device 3 and a preliminary authentication process to notify the authentication server 7 that the authentication device 3 is in an authenticated state. The second process is a short distance communication process performed when the authentication device 3, which is in an authenticated state, approaches the information processing apparatus 5. The third process includes an identification process of a user wearing the authentication device 3 when the user operates the operation panel 512, and an acceptance process of the operation.

The first process will be specifically explained. In step S11, the device control unit 310 determines whether or not the authentication device 3 is worn on a user's body. If the authentication device 3 is worn on a user (step S11: Y), the device control unit 310 acquires the biometric information of the user (step S12), and sets a biometric authentication success flag to 0 (step S13). Conversely, the authentication device 3 is not worn on a user (step S11: N), the device control unit 310 repeats step S11. In step S14, the device control unit 310 determines whether or not the acquired biometric information is of the same user as the stored biometric information. If it is determined that the acquired biometric information is of the same user as the stored biometric information (step S14: Y), the device control unit 310 sets the biometric authentication success flag to 1 (step S15). Conversely, if it is determined that the acquired biometric information is not of the same user as the stored biometric information (step S14: N), the device control unit 310 sets the biometric authentication success flag to 2 (step S20). In step S16, the device control unit 310 determines whether or not the biometric authentication success flag is 1. If it is determined that the biometric authentication success flag is 1 (step S16: Y), the device control unit 310 transmits an authenticated state notification to the authentication server 7 (step S17).

In other words, when a user wears the authentication device 3, the device control unit 310 determines whether or not the biometric information of a user permitted to use the information processing apparatus 5 as stored in the nonvolatile memory 316 in advance is of the same user as the biometric information acquired from a user wearing the authentication device 3, and if it is determined that they are of the same user, the device control unit 310 determines that the authentication succeeds and transmits the authentication result and the ID information of the permitted user to the authentication server 7 through the network 9 as information indicating that the user possessing the authentication device 3 wears the authentication device 3 and that the authentication device 3 is in an authenticated state. Accordingly, the authentication server 7 can store the information indicating that the authentication device 3 worn on the user's body is in an authenticated state.

Conversely, if it is determined that the biometric authentication success flag is not 1, (step S16: N), the device control unit 310 terminates the first process. In other words, when the biometric authentication fails, the device control unit 310 does not perform the notification process to notify the authentication server 7 of this fact. Meanwhile, when the biometric authentication fails, the device control unit 310 may disable the function of the authentication device 3, for example, the network connecting function or the short distance communication function.

In step S18, the device control unit 310 determines whether or not the authentication device 3 is taken off from the user. If it is determined that the authentication device 3 is taken off from the user (step S18: Y), the device control unit 310 transmits an authentication reset notification to the authentication server 7 (step S19) and terminates the first process. Conversely, if it is determined that the authentication device 3 is not taken off from the user (step S18: N), the device control unit 310 repeats step S18. In other words, when a user takes off the authentication device 3, the device control unit 310 detects that the authentication device 3 is taken off from the user by the wearing detection sensor 319 which can detect whether or not the authentication device 3 is being worn, and transmits an authentication reset notification to the authentication server 7. The authentication server 7 can therefore store the information indicating that the authentication device 3 is not in an authenticated state.

The second process will be specifically explained. In step S31, the apparatus control unit 510 determines whether or not a nearby authentication device 3 is detected. If it is determined that a nearby authentication device 3 is detected (step S31: Y), the apparatus control unit 510 starts short distance communication with the authentication device 3 (step S32). Conversely, if it is determined that a nearby authentication device 3 is not detected (step S31: N), the apparatus control unit 510 repeats step S31. In step S33, the apparatus control unit 510 determines whether or not the ID information of a permitted user is received. If it is determined that the ID information of a permitted user is received (step S33: Y), the apparatus control unit 510 queries the authentication server 7 to determine whether or not the received ID information is associated with the authentication device 3 which is in an authenticated state (step S34). Conversely, if it is determined that the ID information of a permitted user is not received (step S33: N), the apparatus control unit 510 repeats step S33. In step S35, the apparatus control unit 510 determines whether or not a query result is received from the authentication server 7. If it is determined that a query result is received from the authentication server 7 (step S35: Y), the process proceeds to step S36. Conversely, if it is determined that a query result is not received from the authentication server 7 (step S35: N), the apparatus control unit 510 repeats step S35. In step S36, the apparatus control unit 510 determines whether or not the received ID information is associated with the authentication device 3 which is in an authenticated state. If it is determined that the received ID information is associated with the authentication device 3 which is in an authenticated state (step S36: Y), the apparatus control unit 510 continues short distance communication with the authentication device 3 (step S37) and terminates the second process. Conversely, if it is determined that the received ID information is not associated with the authentication device 3 which is in an authenticated state (step S36: N), the apparatus control unit 510 terminates short distance communication with the authentication device 3 (step S38) and terminates the second process.

The third process will be specifically explained. In step S51, the device control unit 310 determines whether or not motion to operate the operation panel 512 is detected. If it is determined that motion to operate the operation panel 512 is detected (step S51: Y), the device control unit 310 transmits operation information corresponding to the detected motion to the information processing apparatus 5 (step S52). Conversely, if it is determined that motion to operate the operation panel 512 is not detected (step S51: N), the device control unit 310 repeats step S51. In other words, while performing short distance communication with the information processing apparatus 5, the authentication device 3 detects, with the acceleration sensor 318, vibration caused when a user operates the operation panel 512 of the information processing apparatus 5, transmits time information when the operation panel 512 is operated and the ID information of the user who has operated the operation panel 512 to the information processing apparatus 5 as operation information indicating the fact that the user has operated the operation panel 512. Incidentally, since the process in step S52 is performed after the process in step S51, the transmission of operation information from the authentication device 3 to the information processing apparatus 5 in step S52 means that the authentication device 3 detect motion or vibration of a user.

In step S61, the apparatus control unit 510 determines whether or not the operation panel 512 is operated. If it is determined that the operation panel 512 is operated, (step S61: Y), the apparatus control unit 510 stores operation history information about the operation of the operation panel 512 (step S62). Conversely, if it is determined that the operation panel 512 is not operated, (step S61: N), the apparatus control unit 510 repeats step S61. Specifically, the operation history information contains time information when the operation panel 512 is operated and operation content, i.e., information about an operation. Specifically, the operation content includes selected items of layers and icons of displayed content. For example, during a series of operations such as selecting a job list tab from among various tabs displayed on the operation panel 512 and selecting schedule icon after the job list tab is displayed, a particular layer and a particular icon are selected in the displayed content. Items which are successively selected are stored in the apparatus storage unit 516 or the main memory 515 as operation information together with time information. Incidentally, based on the operation content detected by the operation panel 512, the operational type of user's operation such as swiping, flicking, tapping, pushing or the like may be detected. This is performed by successively storing the track of the coordinates when the operation panel 512 is pressed.

In step S63, the apparatus control unit 510 determines whether or not operation information is received from the authentication device 3 performing short distance communication. If it is determined that operation information is received from the authentication device 3 performing short distance communication (step S63: Y), the apparatus control unit 510 sets a pairing success flag to 0 (step S64) and compares operation history information and operation information to determine whether or not they match as information about operation of the same operation panel 512. Specifically, the apparatus control unit 510 determines whether or not time information contained in operation history information matches time information contained in operation information (step S65). Incidentally, even if time information contained in operation history information does not exactly match time information contained in operation information, they are considered to match within a certain allowable range of time. Conversely, if it is determined that operation information is not received from the authentication device 3 performing short distance communication (step S63: N), the apparatus control unit 510 repeats step S63.

In step S66, the apparatus control unit 510 determines whether or not operation history information and operation information match as information about operation of the same operation panel 512 on the basis of the process in step S65. If operation history information and operation information match as information about operation of the same operation panel 512 (step S66: Y), the apparatus control unit 510 sets the pairing success flag to 1 (step S67). Conversely, if operation history information and operation information are not generated as information about operation of the same operation panel 512 (step S66: N), the apparatus control unit 510 sets the pairing success flag to 2 (step S71). In step S68, the apparatus control unit 510 determines whether or not the pairing success flag is 1. If it is determined that the pairing success flag is 1 (step S68: Y), the apparatus control unit 510 proceeds to step S69. Conversely, if it is determined that the pairing success flag is not 1 (step S68: N), the apparatus control unit 510 refuse to accept operation of the operation panel 512 (step S72), and terminates the third process.

In step S69, the apparatus control unit 510 determines whether or not the operation of the operation panel 512 is permitted by the operational authority of a user. If it is determined that the operation of the operation panel 512 is permitted by the operational authority of a user (step S69: Y), the apparatus control unit 510 accepts operation of the operation panel 512 (step S70), and terminates the third process. Conversely, if it is determined that the operation of the operation panel 512 is not permitted by the operational authority of a user (step S69: N), the apparatus control unit 510 proceeds to step S72 to perform the process as described above, and terminates the third process. Specifically, since the authentication server 7 manages the operation permission determination table 7112, the information processing apparatus 5 can determine whether or not an operation is permitted to a user based on the ID information and the operation content by requesting the authentication server 7 to refer to the operation permission determination table 7112. In other words, while a user operates the operation panel 512, the authentication device 3 notifies the apparatus control unit 510 of operation information, and the operation panel 512 notifies the apparatus control unit 510 of operation information. As a result, the apparatus control unit 510 stores operation history information and operation information in the apparatus storage unit 516, performs a pairing success/fail confirmation process in steps S65 to S67 and S71 and, if the pairing succeeds, requests the authentication server 7 to confirm operation permission based on the authority information of a user. As a result, if the operation of the operation panel 512 is permitted by the operational authority of a user, the authentication server 7 transmits an operation permission notification to the information processing apparatus 5, and the apparatus control unit 510 notifies the operation panel 512 of operation acceptance as a request for switching the display, so that the operation panel 512 accepts user's operation.

In other words, the information processing apparatus 5 saves information about operation of the operation panel 512 as operation history information, and then receives operation information from the nearby authentication device 3 performing short distance communication. When comparing the received operation information with the saved operation history information, the information processing apparatus 5 refers to the operation times of the operation history information and the operation information respectively to determine whether or not the operation history information and the operation information match as information about operation of the same operation panel 512, and determines that pairing succeeds if they are generated from the same operation panel 512. After the pairing succeeds, the apparatus control unit 510 determines whether or not the operations which are paired correspond to an operation which is permitted by the operational authority given to the user who has performed the operation of the pairing. If the operation of the pairing is the permitted operation, the apparatus control unit 510 accepts the operation and performs the control indicated by the operation. On the other hand, if the pairing fails or if the operation of the pairing which succeeds is an operation which is not permitted by the operational authority given to the user who has performed the operation of the pairing, the apparatus control unit 510 does not accept the operation.

Incidentally, the ID information of the present disclosure is identification information.

As has been discussed above, conventionally, after shifting to a log-in state by a log-in operation in which it is required to input a user ID and a password, the information processing apparatus 5 maintains the log-in state associated with the user ID until logging out. Accordingly, while the log-in state of a certain user having a user ID is maintained, the information processing apparatus 5 accepts an operation corresponding to the operational authority assigned to the user ID of the certain user even if the operation is performed by another user who is different from the certain user and has not the user ID of the certain user. Accordingly, unauthorized use of the information processing apparatus 5 or the like is possible by an impersonating operation by a third person such as another user, so that it is needed to improve the security level.

For this reason, the information processing system 1 according to the present disclosure accepts an operation of the operation panel 512 performed by a user if the user is permitted to use the information processing apparatus 5 and if operation history information which is time series data of a sequence of operations accepted by the operation panel 512 and operation information which is related to operation of the operation panel 512 and acquired from the authentication device 3 carried by the user, are compared to confirm that they match as information about operation of the same operation panel 512. It is therefore possible to identify an individual who performed operation of the operation panel 512 by confirming that the user as the individual is permitted to user the information processing apparatus 5 and comparing operation history information and operation information. By this configuration, an individual who performed operation of the operation panel 512 can be identified so that it is possible to prevent an impersonating operation by a third person. Also, user's operation is accepted if the user is permitted to use the information processing apparatus 5 and if operation history information matches operation information, so that the user can continue operation without being required to perform a troublesome operation. It is therefore possible to improve a security level and user convenience.

Furthermore, if the biometric information acquired from a user is of the same user as the biometric information of a permitted user registered in the biometric information table 3109, the information processing system 1 according to the present disclosure transmits the ID information of the permitted user associated with the biometric information of the permitted user registered in the biometric information table 3109 to the information processing apparatus 5. The information processing apparatus 5 can thereby acquire the ID information corresponding to a user carrying the authentication device 3 which is performing short distance communication. The information processing apparatus 5 can thereby query the authentication server 7 to determine whether or not a user carrying the authentication device 3 is in an authenticated state.

Also, if it is determined that the ID information of a permitted user received by the information processing apparatus 5 from the authentication device 3 is the ID information of a permitted user associated with the authentication device 3 which is in an authenticated state, the information processing system 1 according to the present disclosure performs the matching process. Accordingly, the matching process is performed only when the authentication device 3 is in an authenticated state, it is possible to prevent an impersonating operation by a third person in the matching process.

Furthermore, if operation history information and operation information are compared to determine that they match as information about operation of the same operation panel 512 and if an operational authority is given with respect to the operation content, the information processing system 1 according to the present disclosure permits the user to operate the operation panel 512. It is therefore possible to accept user's operation only with respect to operation content given an operational authority each time the user operates the operation panel 512. It is therefore possible to significantly improve a security level.

Also, when the operation performed by a user is a particular operation, the information processing system 1 according to the present disclosure determines whether or not the user is given an operational authority to perform this operation. Accordingly, since existence of an operational authority is determined when a user performs a particular operation, it is possible to lessen the burden of the information processing apparatus 5.

Furthermore, when the operation performed by a user is a particular operation, the information processing system 1 according to the present disclosure performs the matching process. Since the matching process is performed when a user performs a particular operation such as an operation requiring a high level security, it is possible to further lessen the burden of the information processing apparatus 5.

The information processing system 1 has been explained based on the embodiment in accordance with the present disclosure. However, it is not intended to limit the present disclosure to the precise form described, and obviously many modifications and variations are possible without departing from the spirit and scope of the invention.

For example, while the authentication device 3 is a wearable terminal which can be worn on a user's arm in the above example, the present invention is not limited thereto, but the authentication device 3 can be a wearable terminal which can be worn on a user's leg, head, torso or the like. In other words, the authentication device 3 can have any form as long as a user permitted to use the information processing apparatus 5 can carry it. Also, while the authentication device 3 has a function to perform electrocardiogram authentication in the above example, the present invention is not limited thereto, but another biometric authentication can be used instead such as vein authentication, fingerprint authentication, iris authentication, handwriting authentication or the like. In other words, the authentication device 3 can be implemented with functionality of performing any authentication which can identify a user with reference to feature amounts based on a physical or active feature of a person. While the above example is explained with a correlation coefficient indicative of the degree of correlation which is used to compare feature amounts, the present invention is not limited to this, but feature amounts can be compared by converting the feature amounts to be compared into an index which can be used to compare the feature amounts with some type of mapping. Also, while the authentication device 3 is provided with the acceleration sensor 318 in the above example, the authentication device 3 can be provided with a gyro sensor in place of or in addition to the acceleration sensor 318 so that motion or vibration of a user can be detected while switching the detection area of the gyro sensor. Furthermore, while it is detected by the wearing detection sensor 319 whether or not the authentication device 3 is worn in the above example, the present invention is not limited to this, but another detection mechanism can be used to detect whether or not the authentication device 3 is worn. For example, if the biometric authentication device 317 cannot acquire the biometric information of a user for a certain period, the device control unit 310 can determine that the authentication device 3 is not worn on the user's body.

Still further, while the various flags are used in the various determination process as described above, the present invention is not limited to this, but another mechanism for such determination can be used as long as the determination result is used to select the subsequent process.

Still further, while the authentication server 7 is connected to the authentication device 3 or the information processing apparatus 5 through the network 9 in the above example, the authentication server 7 can be implemented further with functionality of a WebDAV server in order that another apparatus can refer to the device information setting table 7111 and the operation permission determination table 7112 which are managed by the authentication server 7 and that the information processing apparatus 5 can refer to the device information setting table 7111 and the operation permission determination table 7112 through this another apparatus.

Still further, the CPU 311 generally controls the authentication device 3 in the above example, the present invention is not limited thereto, but the authentication device 3 can be generally controlled by a multicore processor in which a plurality of cores are integrated.

Still further, while the nonvolatile memory 316 is used to store the program to be run by the CPU 311 in the above example, the present invention is not limited thereto but an optical disk, an IC card, an optical card, or a semiconductor memory such as a mask ROM, an EPROM (Erasable Programmable ROM) and an EEPROM (Electrically EPROM) can be used instead.

Still further, while the apparatus storage unit 516 is used to store the program to be run by the CPU 511 in the above example, the present invention is not limited thereto but an optical disk, an IC card, an optical card, or a semiconductor memory such as a mask ROM, an EPROM (Erasable Programmable ROM) and an EEPROM (Electrically EPROM) can be used instead.

Still further, another computer connected to the network 9 and not shown in the figure can rewrite the program stored in or add a new program to the nonvolatile memory 316 of the authentication device 3 or the apparatus storage unit 516 of the information processing apparatus 5. Still further, the authentication device 3 or the information processing apparatus 5 can be configured to download a program from another computer connected to the network 9 and not shown in the figure and store the downloaded program in the nonvolatile memory 316 of the authentication device 3 or the apparatus storage unit 516 of the information processing apparatus 5. Such programs include not only programs which can be directly run by the CPU 311 or the CPU 511 but also programs in the forms of source programs, compressed programs, encoded programs and so forth.

Also, while operation history information and operation information are compared with respect to the time information contained therein to determine whether or not they match as information about operation of the same operation panel 512 in the above example, the present invention is not limited thereto, but operation history information and operation information are compared with respect to the types of operations contained therein to determine whether or not they match as information about operation of the same operation panel 512. In other words, operation history information and operation information can be compared with respect to an attribute of the information as long as it is possible to determine whether or not they match as information about operation of the same operation panel 512.

Meanwhile, the series of processes as described above may be performed by hardware or software. In the case where the series of processes are performed by software, various programs of the software are installed in a computer which can realize the above functions by running the various programs, and the various programs can be installed by reading them from a recording medium or downloading them from the Internet.

Although embodiments of the present invention have been described and illustrated in detail, the disclosed embodiments are made for purposes of illustration and example only and not limitation. The scope of the present invention should be interpreted by terms of the appended claims.

What is claimed is:

1. An information processing apparatus which is operated by a user who carries an authentication device, comprising:
an operation panel which accepts an operation performed by the user; and
an apparatus hardware processor which controls the operation panel, wherein
the apparatus hardware processor performs a matching process of determining whether or not operation history information which is time series data of a sequence of operations performed by the user and accepted by the operation panel, and operation information which is about an operation of the operation panel performed by the user authenticated as a permitted user who is permitted to use the information processing apparatus and which is acquired from the authentication device carried by the user, match as information about operation of the same operation panel, and wherein
if it is determined by the matching process that the operation history information and the operation information match as information about operation of the same operation panel, the apparatus hardware processor performs an operation acceptance process to accept the operation of the operation panel performed by the user.

2. The information processing apparatus of claim 1 wherein
if biometric information acquired from the user is of the same user as biometric information of the permitted user, the authentication device is authenticated and transmits identification information of the permitted user to the information processing apparatus, and wherein
if the identification information of the permitted user transmitted from the authentication device is identification information associated with the authentication device which is in an authenticated state, the apparatus hardware processor performs the matching process.

3. The information processing apparatus of claim 2 wherein
if it is determined that the operation history information and the operation information match as information about operation of the same operation panel and if the user is given an operational authority to perform the operation accepted by the operation panel, the apparatus hardware processor accepts the operation of the operation panel performed by the user.

4. The information processing apparatus of claim 3 wherein
when the operation accepted by the operation panel is a particular operation, the apparatus hardware processor determines whether or not an operational authority to perform the operation is given.

5. The information processing apparatus of claim 1 wherein
when the operation accepted by the operation panel is a particular operation, the apparatus hardware processor performs the matching process.

6. An information processing system including an information processing apparatus and an authentication device carried by a user who operates the information processing apparatus, the information processing apparatus and the authentication device being connected to each other, wherein
the authentication device comprises:
a short distance communication module capable of performing communication with the information processing apparatus;
a device hardware processor which controls the short distance communication module, wherein
the information processing apparatus comprises:
an operation panel which accepts an operation performed by the user;
an apparatus hardware processor which controls the operation panel, wherein
the device hardware processor performs an authentication process to determine whether or not the user is a permitted user who is permitted to use the information processing apparatus, wherein
the device hardware processor performs an operation process to generate operation information which is about an operation of the operation panel performed by the permitted user authenticated by the authentication process and which is acquired from the authentication device carried by the user, wherein
the device hardware processor performs an operation information process to transmit the operation information generated by the operation process to the information processing apparatus through the short distance communication module, wherein
the apparatus hardware processor performs a matching process of determining whether or not operation history information which is time series data of a sequence of operations accepted by the operation panel, and the operation information transmitted by the operation information process match as information about operation of the same operation panel, and wherein
if it is determined by the matching process that the operation history information and the operation information match as information about operation of the same operation panel, the apparatus hardware processor performs an operation acceptance process to accept the operation of the operation panel performed by the user.

7. The information processing system of claim 6 wherein
the device hardware processor further comprises a biometric information table in which are stored biometric information and identification information of the permitted user, and wherein
if it is determined by the authentication process that biometric information acquired from the user is of the same user as biometric information stored in the biometric information table, the identification information of the permitted user is transmitted to the information processing apparatus by the operation information process.

8. The information processing system of claim 7 further comprising an authentication server which manages the identification information of the permitted user, wherein
the authentication server comprises a device information setting table in which an authentication result of the authentication process is stored in association with the identification information of the permitted user, wherein
if it is determined that biometric information acquired from the user is of the same user as biometric information stored in the biometric information table, the device information setting table is used to store an authentication result of the authentication process that the authentication device carried by the user is in an authenticated state, and wherein
if it is determined that the identification information of the permitted user transmitted from the authentication device to the information processing apparatus is the identification information of the permitted user associated with the authentication device which is in an authenticated state, the apparatus hardware processor performs the matching process.

9. The information processing system of claim 8 wherein
the authentication server further comprises an operation permission determination table in which are stored information about the operation performed by the user and accepted by the operation panel and information which can be used to determine an operational authority to perform the operation, and wherein
if it is determined by the matching process that the operation history information and the operation information match as information about operation of the same operation panel and if the user is given an operational authority to perform the operation accepted by the operation panel on the basis of the operation permission determination table, the user is permitted to perform operation of the operation panel by the operation acceptance process.

10. The information processing system of claim 9 wherein
the operation permission determination table is used to further store, in association with the information stored therein, information about whether or not the operation accepted by the operation panel is a particular operation, wherein
if it is determined by the matching process that the operation history information and the operation information match as information about operation of the same operation panel and if it is determined based on the operation permission determination table that the operation accepted by the operation panel is a particular operation, the operation acceptance process is performed to determine whether or not the user is given an operational authority to perform the operation accepted by the operation panel.

11. A non-transitory computer readable medium including programmed instructions, wherein the instructions, when executed by a computer, cause the computer to perform:
a matching process of determining whether or not operation history information which is time series data of a sequence of operations performed by a user and accepted by an operation panel, and operation information which is about an operation of the operation panel performed by the user authenticated as a permitted user who is permitted to use an information processing apparatus and which is acquired from an authentication device carried by the user, match as information about operation of the same operation panel; and an operation acceptance process to accept an operation of the operation panel performed by the user if it is determined by the matching process that the operation history information and the operation information match as information about operation of the same operation panel.

* * * * *